(12) United States Patent
Huang et al.

(10) Patent No.: US 7,764,508 B2
(45) Date of Patent: Jul. 27, 2010

(54) PORTABLE NOTEBOOK COMPUTER MOTHERBOARD

(75) Inventors: Mao-Chang Huang, Tu-Cheng (TW); Chien-Li Tsai, Tu-Cheng (TW); Lien-Fa Chen, Tu-Cheng (TW); Hsi-Yu Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 994 days.

(21) Appl. No.: 11/309,033

(22) Filed: Jun. 12, 2006

(65) Prior Publication Data

US 2007/0130404 A1 Jun. 7, 2007

(30) Foreign Application Priority Data

Jul. 29, 2005 (CN) ........................ 2005 1 0036279

(51) Int. Cl.
*H05K 1/18* (2006.01)
(52) U.S. Cl. .................. 361/761; 361/760; 361/763; 361/807
(58) Field of Classification Search ......... 361/760–763, 361/807–811, 681–686
See application file for complete search history.

(56) References Cited

U.S. PATENT DOCUMENTS

| 6,444,979 | B1 * | 9/2002 | Watanabe | 250/282 |
| 6,456,488 | B1 | 9/2002 | Foster et al. | |
| 2005/0120153 | A1 * | 6/2005 | Perez et al. | 710/62 |
| 2006/0002061 | A1 * | 1/2006 | Hua | 361/680 |

* cited by examiner

*Primary Examiner*—Tuan T Dinh
(74) *Attorney, Agent, or Firm*—Wei Te Chung

(57) ABSTRACT

A motherboard for a portable notebook computer includes a circuit board, and an extension card module connected with the circuit board. The circuit board defines a cutout in one corner thereof and includes a top layer and a bottom layer. The top layer includes a first area, a second area, a third area, and a fourth area. The first area and the third area are located near one edge of the circuit board. The second area and the fourth area are located near an opposite edge of the circuit board. The first area and the second area are near the cutout. A central processing unit, a graphics processing unit (GPU), a peripheral component interconnect (PCI) card, and a memory are located on the first through fourth areas of the circuit board respectively. The extension card module selectively receives a variety of extension cards.

10 Claims, 6 Drawing Sheets

PORTABLE NOTEBOOK COMPUTER MOTHERBOARD

FIELD OF THE INVENTION

The present invention relates to a portable notebook computer motherboard, and particularly to a portable notebook computer motherboard which is compatible with different central processing units (CPUs) and installable in a variety of enclosures having different sizes.

DESCRIPTION OF RELATED ART

Generally, personal computers can be classified into desktop computers, portable notebook computers, and etc. The desktop computer is easy to upgrade but inconvenient in carrying from place to place. The portable notebook computer however, is thin and lightweight. Therefore, the portable notebook computer is very popular since it provides considerable convenience. The convenience and transportability of the notebook computer has created a large and lucrative market for manufacturers of such machines. A motherboard is a core component of the portable notebook computer. To meet user's needs, manufacturers' designs include different motherboards with different sizes and structures that are compatible with different CPUs and enclosures. However, to design the motherboard for every type portable notebook computer is time-consuming and increases the cost of manufacturing.

What is needed is a motherboard compatible with different CPUs and installable in a variety of enclosures having different sizes.

SUMMARY OF THE INVENTION

An exemplary motherboard for a portable notebook computer includes a circuit board, and an extension card module connected with the circuit board. The circuit board defines a cutout in one corner thereof and includes a top layer and a bottom layer. The top layer includes a first area, a second area, a third area, and a fourth area. The first area and the third area are located on one side of the circuit board. The second area and the fourth area are located on an opposite side of the circuit board. The first area and the second area are near the cutout. A CPU, a graphics processing unit (GPU), a peripheral component interconnect (PCI) card, and a memory are located on the first through fourth areas of the circuit board respectively. The extension card module can selectively receive a variety of extension cards.

Other objects, advantages, and novel features will become more apparent from the following detailed description when taken in conjunction with the accompanying drawings, in which:

DETAILED DESCRIPTION OF THE INVENTION

Figure 1:
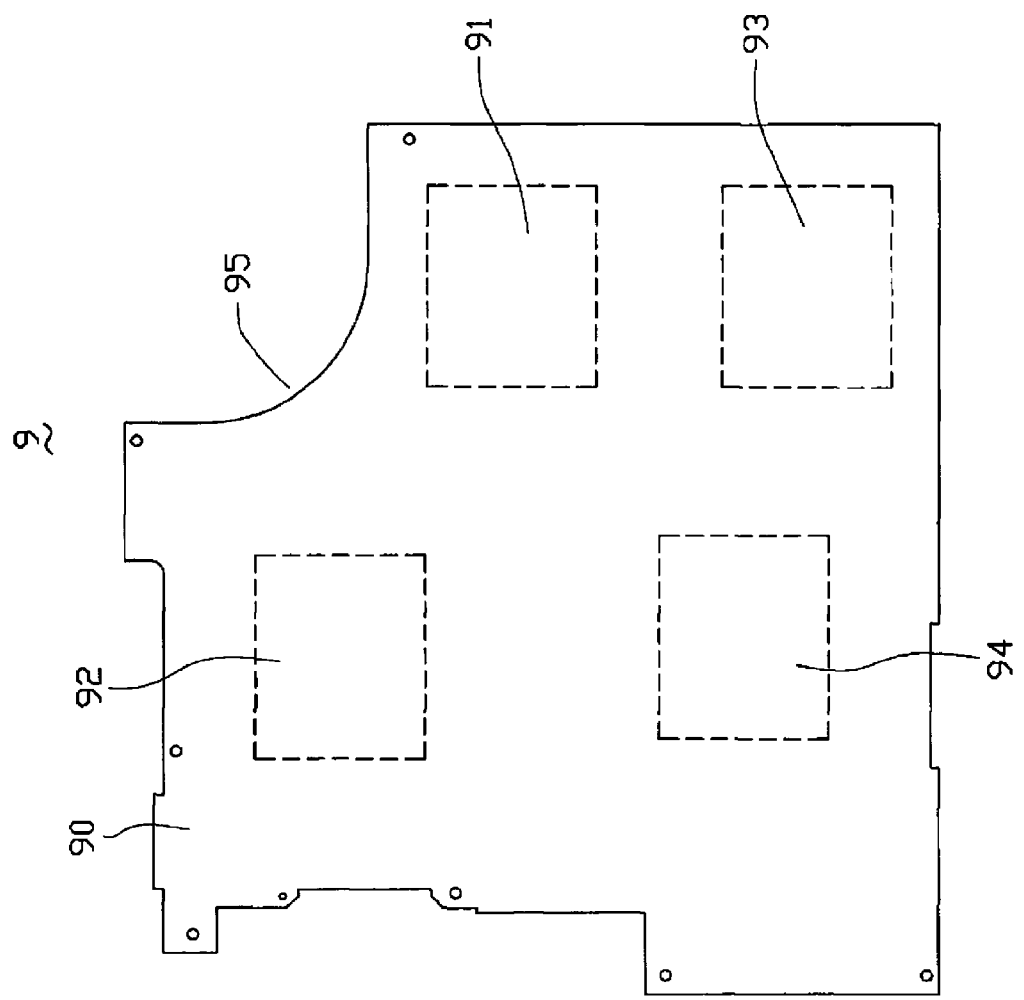
FIG. 1 is a schematic diagram of a structure of a circuit board, according to the present invention.

Referring to FIG. 1, a schematic diagram of a structure of a circuit board 9 according to the present invention, is shown. The circuit board 9 defines a cutout 95 in one corner thereof. The circuit board 9 includes a first area 91, a second area 92, a third area 93, and a fourth area 94. The first area 91 and the third area 93 are located on one side of the circuit board 9 and the first area 91 is near the cutout 95. The second area 92 and the fourth area 94 are located on an opposite side of the circuit board 9. The second area is near the cutout 95. The first through fourth areas 91-94 are for receiving electronic components such as a central processing unit (CPU), a graphics processing unit (GPU), a peripheral component interconnect (PCI) card, and a memory.

Figure 2:
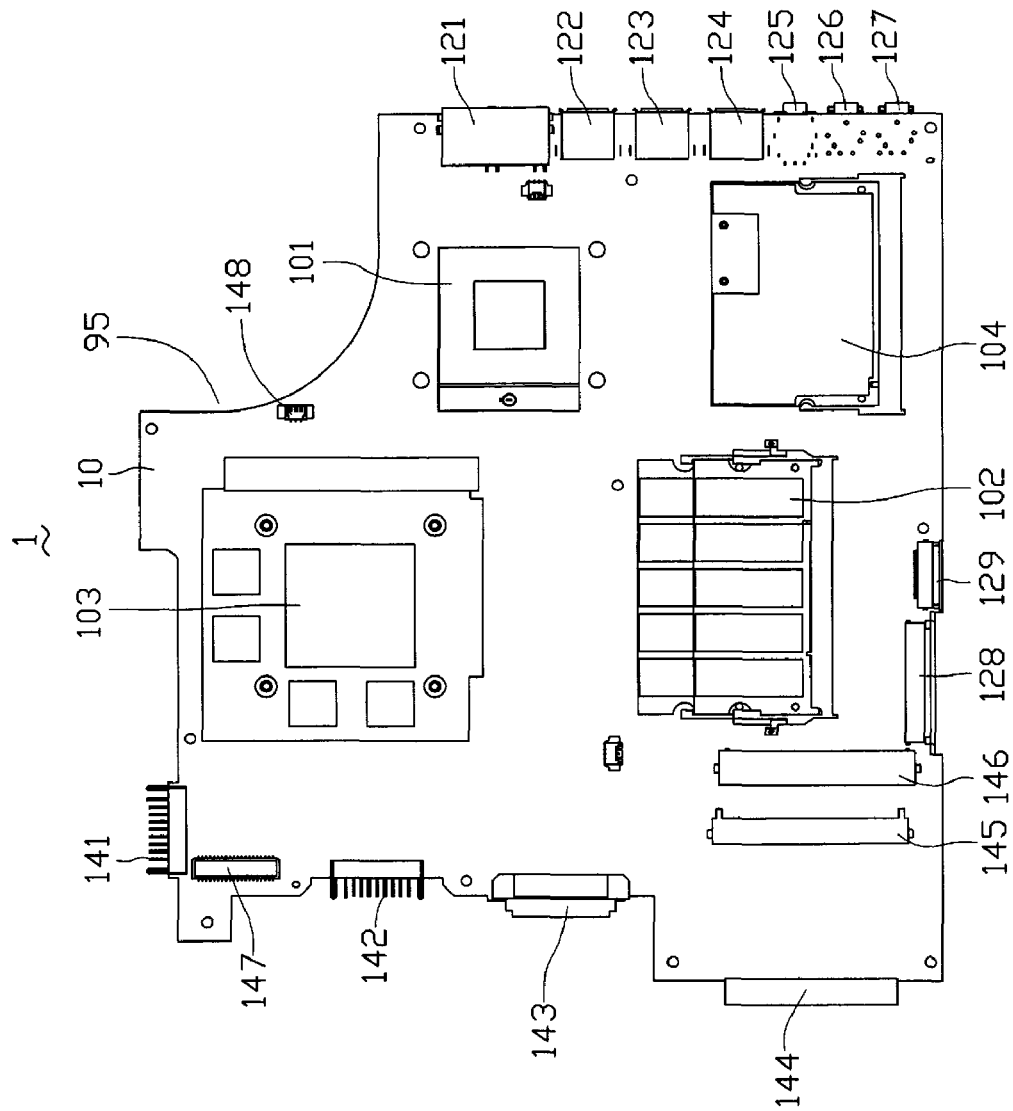
FIG. 2 is a plan view of a top layer of a motherboard, in accordance with one preferred embodiment of the present invention.

Referring to FIG. 2, a plan view of a top layer 10 of a motherboard 1, in accordance with one preferred embodiment of the present invention is shown. The motherboard 1 includes a CPU 101, a memory 102, a GPU 103, and a PCI card 104 installed on the top layer 10 thereof. A cutout 15 is defined in one corner of the motherboard 1. The CPU 101 is an Intel CPU. The CPU 101 and the PCI card 104 are located on one side of the top layer 10 and the CPU 101 is near the cutout 15. The memory 102 and the GPU 103 are located on an opposite side of the top layer 10 and the GPU 103 is near the cutout 15. A number of interfaces and connectors are set at or near edges of the top layer 10. The interfaces include an Ethernet interface 121, three universal serial bus (USB) interfaces 122, 123, 124, an Institute of Electrical and Electronics Engineers (IEEE) 1394 interface 125, an earphone interface 126, a microphone 127, an interior mike interface 128, and an audio interface 129 which are all located near the PCI card 104. The connectors include a battery connector 141, a spare battery connector 142, an optical disc drive connector 143, an extension card module connector 144 which are all located at the edges of the motherboard 1, a hard disc drive connector 145, a spare hard disc drive connector 146, a panel connector 147 which are all near the edges of the motherboard 1, and a fan connector 148 which is near the cutout 95.

Figure 3:
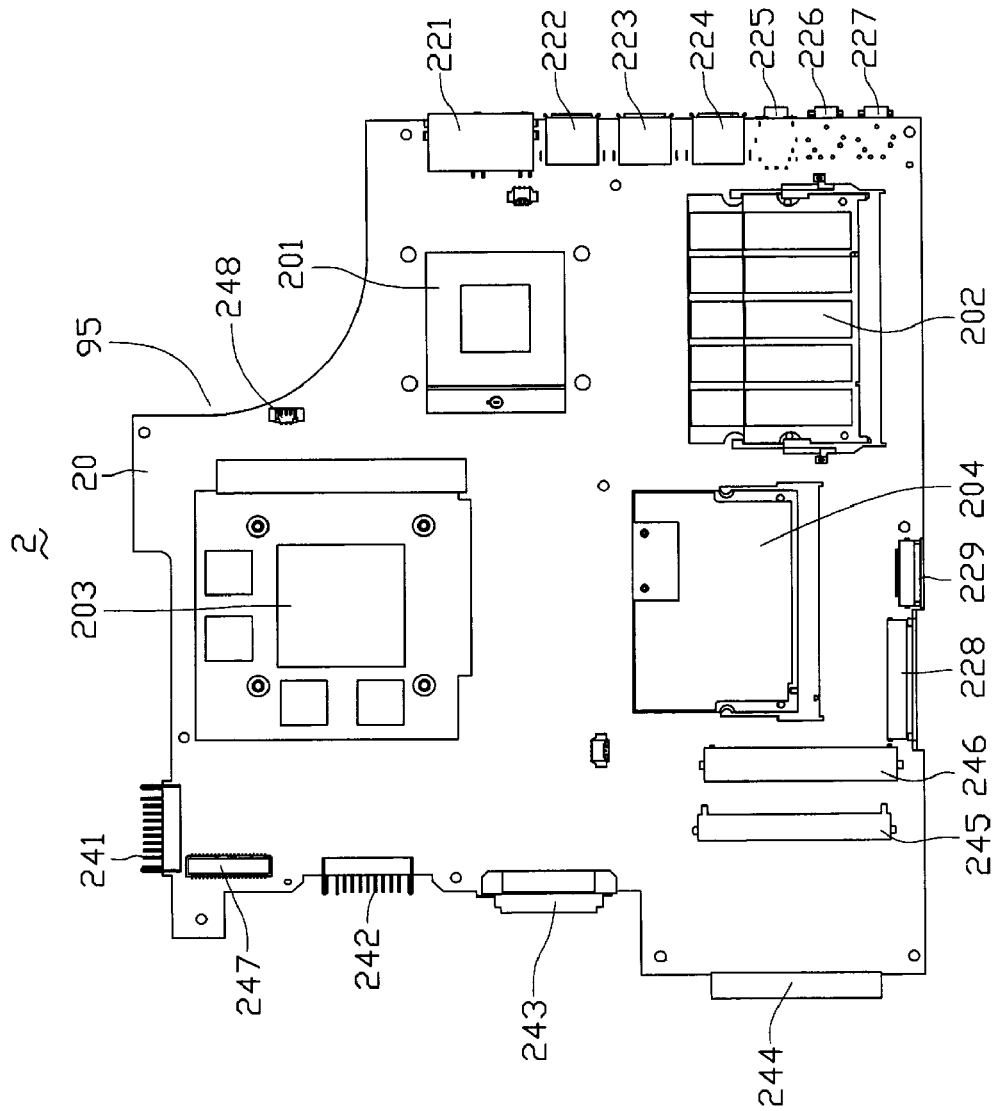
FIG. 3 is a plan view of a top layer of a motherboard, in accordance with another preferred embodiment of the present invention.

Referring to FIG. 3, a plan view of a top layer 20 of a motherboard 2, in accordance with another preferred embodiment of the present invention is shown. The motherboard 2 includes a CPU 201, a memory 202, a GPU 203, and a PCI card 204 installed on the top layer 20 thereof. A cutout 25 is defined in one corner of the motherboard 2. The CPU 201 is an AMD CPU. The CPU 201 and the memory 202 are located on one side of the top layer 20 and the CPU 201 is near the cutout 25. The PCI card 204 and the GPU 203 are located on an opposite side of the top layer 20 and the GPU 203 is near the cutout 25. A number of interfaces and connectors are set at or near edges of the top layer 20. The interfaces and connectors include an ethernet interface 221, three USB interfaces 222, 223, 224, an IEEE1394 interface 225, an earphone interface 226, a microphone 227, an interior mike interface 228, an audio interface 229, a battery connector 241, a spare battery connector 242, an optical disc drive connector 243, an extension card module connector 244, a hard disc drive connector 245, a spare hard disc drive connector 246, a panel connector 247, and a fan connector 248. An arrangement of the connectors and the interfaces on the motherboard 2 is similar with the motherboard 1.

Figure 4:
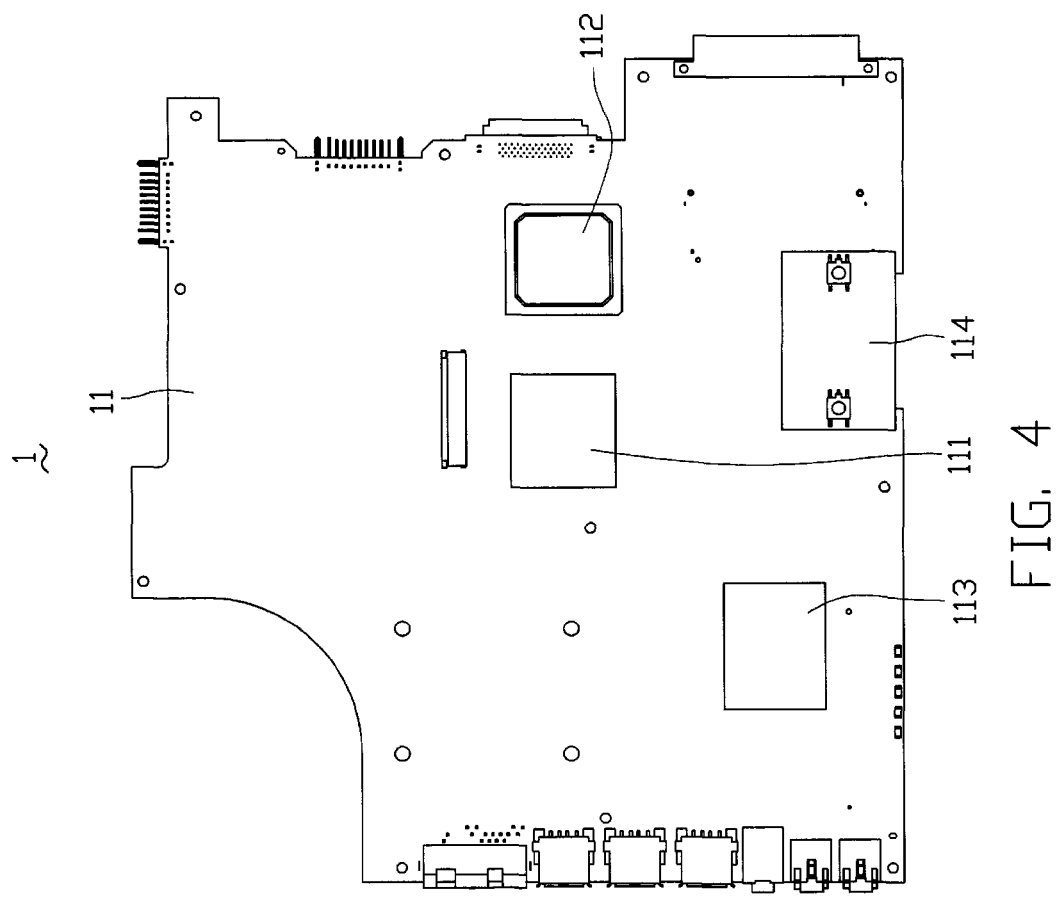
FIG. 4 is a plan view of a bottom layer of the mother board of FIG. 2 and FIG. 3.

Referring to FIG. 4, a plan view of a bottom layer 11 of the motherboard 1 is shown. A north bridge chip 111, a south bridge chip 112, a modem 113, and a touch pad 114 are set on the bottom layer 11. The north bridge chip 111 is located on a middle of the bottom layer 11, for controlling the CPU 101, the memory 102, and the GPU 103 attached to the top layer 10 of the motherboard 1. The south bridge chip 112 is located on a side of the bottom layer 11, corresponding to the hard disc drive connector 145, because the south bridge chip 112 is mainly for controlling a hard disc drive, an extension card and so on. The modem 113 and the touch pad 114 are located along another side of the bottom layer 11. A bottom layer of the motherboard 2 with an AMD CPU has a same structure as the motherboard 1 with the Intel CPU.

Figure 5:
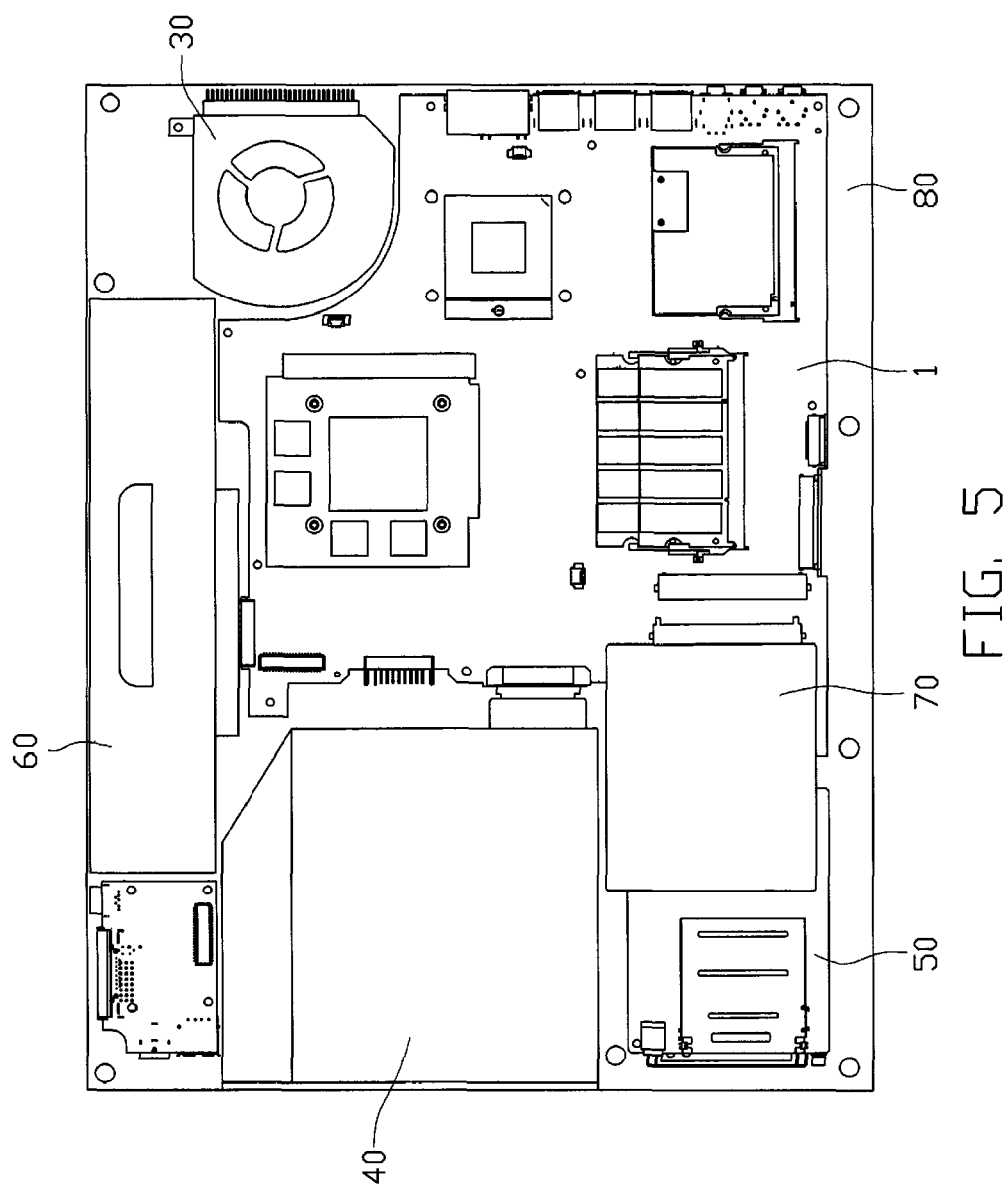
FIG. 5 is an assembled view of the motherboard of FIG. 2 and an enclosure.
Figure 6:
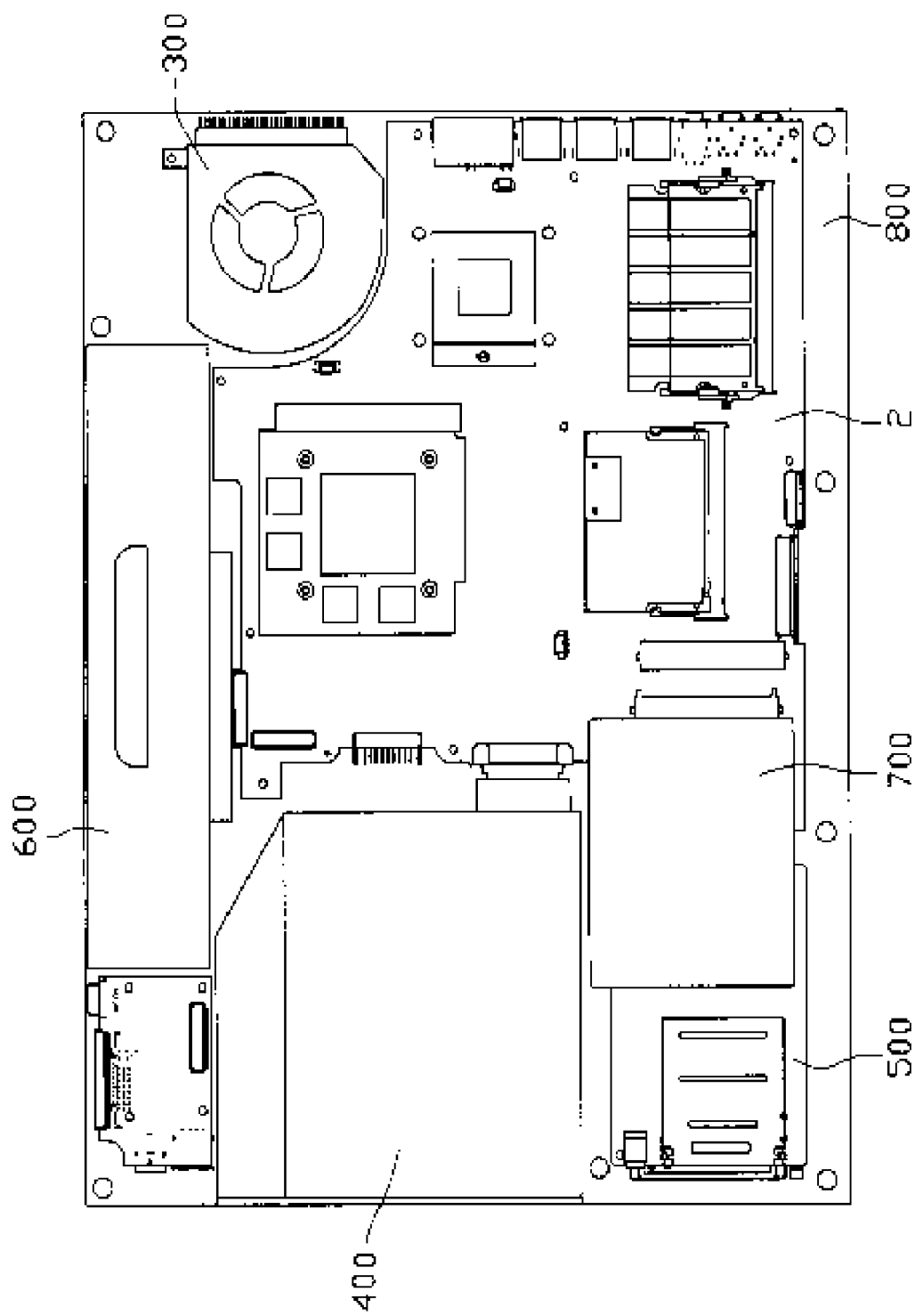
FIG. 6 is an assembled view of the motherboard of FIG. 3 and an enclosure.

FIG. 5 is an assembled view of the motherboard 1 with the Intel CPU and an enclosure 80, and FIG. 6 is an assembled view of the motherboard 2 with the AMD CPU and an enclosure 800. The motherboard 1 is received in the enclosure 80, and occupies a part of an available space of the enclosure 80. A fan 30, an optical disc drive 40, an extension card module 50, a battery 60, and a hard disc drive 70 are located in the remaining available space of the enclosure 80. The fan 30 is received in the cutout 95 of the motherboard 1. The battery 60 is connected to the battery connector 141. The optical disc drive 40 is connected to the optical disc drive connector 143, and the extension card module 50 is connected to the motherboard 1 through the extension card module connector 144, and the extension card module 50 is coplanar with the motherboard 1. The hard disc drive 70 is attached to the hard disc drive connector 145. The motherboard 2 is received in the enclosure 800, and occupies a part of an available space of the enclosure 800. A fan 300, an optical disc drive 400, an extension card module 500, a battery 600, and a hard disc drive 700 are located in the remaining available space of the enclosure 800.

he motherboards 1, 2 have a standard size. The extension card module 50, 500 selectively receive a variety of extension cards according to requirements of users and saves a lot of space allowing for installation of additional electronic components on the motherboard. Therefore, the motherboard of the present invention not only has good utility it is also compatible with different CPUs and installable in a variety of enclosures of different sizes.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A motherboard adapted for a portable notebook computer comprising:
   a circuit board defining a cutout in one corner thereof, the circuit board comprising a top layer and a bottom layer, the top layer comprising a first area, a second area, a third area, and a fourth area, the first area and the third area located adjacent to a first edge of the circuit board, the second area and the fourth area located adjacent to a second edge opposite to the first edge of the circuit board, a distance between the first area and the cutout is less than a distance between the third area and the cutout, a distance between the second area and the cutout is less than a distance between the fourth area and the cutout, the first area is between the cutout and the third area and is between the first edge and the second area, the first and second areas are between the cutout and the fourth area, the second area is between the cutout and the second edge and is between the first area and the second edge, the third area is between the first edge and the fourth area, the fourth area is between the third area and the second edge;
   a central processing unit (CPU) located on the first area of the circuit board;
   a graphics processing unit (GPU) located on the third area of the circuit board;
   a peripheral component interconnect (PCI) card located on the second area of the circuit board;
   a memory located on the fourth area of the circuit board; and
   an extension card module connected with the circuit board, the extension card module being coplanar with the circuit board and can selectively receive a variety of extension cards.

2. The motherboard as claimed in claim 1, wherein the bottom layer of the motherboard comprises a north bridge chip located on a middle of the bottom layer, and a south bridge chip located on a side of the bottom layer.

3. The motherboard as claimed in claim 1, wherein a plurality of interfaces and connectors are located at or near edges of the circuit board.

4. The motherboard as claimed in claim 1, wherein the extension card module is located at the second edge.

5. The motherboard as claimed in claim 3, wherein the interfaces comprise an Ethernet interface, three universal serial bus (USB) interfaces, an Institute of Electrical and Electronics Engineers (IEEE)1394 interface, an earphone interface, a microphone, an interior mike interface, and an audio interface, and the connectors comprise a battery connector, a spare battery connector, an optical disc drive connector, an extension card module connector, a hard disc drive connector, a spare hard disc drive connector, a panel connector, and a fan connector.

6. A motherboard adapted for a portable notebook computer comprising:
   a circuit board comprising opposite first and second edges, and opposite third and fourth edges, wherein a cutout is defined in a corner connecting the first and third edges of the circuit board, the circuit board comprises a top layer and a bottom layer, the top layer comprises a first area, a second area, a third area, and a fourth area, the first area is between the cutout and the third area and is between the first edge and the second area, the second area is between the cutout and the second edge, is between the first area and the second edge, and is between the third edge and the fourth area, the third area is between the first edge and the fourth area and is between the first area and the fourth edge, the fourth area is between the third area and the second edge and is between the second area and the fourth edge;
   a central processing unit (CPU) located on the first area of the circuit board;
   a graphics processing unit (GPU) located on the third area of the circuit board;
   a peripheral component interconnect (PCI) card located on the second area of the circuit board;
   a memory located on the fourth area of the circuit board; and
   an extension card module connected with the circuit board, the extension card module being coplanar with the circuit board and can selectively receive a variety of extension cards.

7. The motherboard as claimed in claim 6, wherein the bottom layer of the motherboard comprises a north bridge chip located on a middle of the bottom layer, and a south bridge chip located on a side of the bottom layer.

8. The motherboard as claimed in claim 6, wherein a plurality of interfaces and connectors are located at or near edges of the circuit board.

9. The motherboard as claimed in claim 6, wherein the extension card module is located at the second edge.

10. The motherboard as claimed in claim 8, wherein the interfaces comprise an Ethernet interface, three universal serial bus (USB) interfaces, an Institute of Electrical and Electronics Engineers (IEEE) 1394 interface, an earphone interface, a microphone, an interior mike interface, and an audio interface, and the connectors comprise a battery connector, a spare battery connector, an optical disc drive connector, an extension card module connector, a hard disc drive connector, a spare hard disc drive connector, a panel connector, and a fan connector.

* * * * *